(12) United States Patent
Masuda et al.

(10) Patent No.: US 12,424,100 B2
(45) Date of Patent: Sep. 23, 2025

(54) CHARGE SUPPORT SYSTEM, CHARGE SUPPORT METHOD, AND CONTROL PROGRAM

(71) Applicant: TOYOTA JIDOSHA KABUSHIKI KAISHA, Toyota (JP)

(72) Inventors: Taizo Masuda, Yokohama (JP); Yasunobu Seki, Nisshin (JP); Hiroki Awano, Susono (JP); Tomoko Nakamura, Naka-gun (JP); Tsuyoshi Kaneko, Nisshin (JP); Kosuke Yonekawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 18/229,308

(22) Filed: Aug. 2, 2023

(65) Prior Publication Data

US 2024/0078910 A1    Mar. 7, 2024

(30) Foreign Application Priority Data

Sep. 7, 2022   (JP) .................................. 2022-142441

(51) Int. Cl.
    *G08G 1/00*   (2006.01)
    *B60L 8/00*   (2006.01)
    *B60L 58/13*  (2019.01)

(52) U.S. Cl.
    CPC .............. *G08G 1/202* (2013.01); *B60L 8/003* (2013.01); *B60L 58/13* (2019.02)

(58) Field of Classification Search
    CPC ......... G08G 1/202; B60L 8/003; B60L 58/13; B60L 50/60; B60L 2260/32; Y02T 10/70;
    (Continued)

(56) References Cited

U.S. PATENT DOCUMENTS

| 2017/0045888 | A1* | 2/2017 | Mattila | H02J 7/00032 |
| 2019/0248243 | A1* | 8/2019 | Gaither | B60L 8/003 |
| 2025/0083551 | A1* | 3/2025 | Tanaka | B60L 53/67 |

FOREIGN PATENT DOCUMENTS

| JP | 2017-511676 A | 4/2017 |
| JP | 2022-122687 A | 8/2022 |

(Continued)

*Primary Examiner* — Aniss Chad
*Assistant Examiner* — Nikki Marie M Molina
(74) *Attorney, Agent, or Firm* — Oliff PLC

(57) ABSTRACT

A charge support system is provided for a plurality of autonomously movable vehicles, each including a solar cell panel and a storage battery for storing electricity from the solar panel. The system includes an acquisition unit that obtains information regarding vehicles parked within a predetermined parking area, including charging efficiencies of the solar panels, current charging rates of the storage batteries, and scheduled driving times for each vehicle. A traveling control unit is configured to move the vehicles within the parking area based on the acquired information. The system prioritizes movement of vehicles with earlier scheduled driving times to areas of higher charging efficiency to ensure their storage batteries reach a predetermined charge threshold. Additionally, for vehicles without scheduled driving times, the system periodically moves the vehicles to equalize battery charge levels within a specified error range. This enables efficient solar charging across multiple vehicles in a shared parking environment.

3 Claims, 4 Drawing Sheets

(58) Field of Classification Search
CPC .......................... Y02T 10/7072; Y02T 90/12;
B60W 60/0025; B60W 2510/242; H02J 7/35

See application file for complete search history.

(56) References Cited

FOREIGN PATENT DOCUMENTS

| | | |
|---|---|---|
| WO | 2015/114200 A1 | 8/2015 |
| WO | 2016/072165 A1 | 5/2016 |

* cited by examiner

CHARGE SUPPORT SYSTEM, CHARGE SUPPORT METHOD, AND CONTROL PROGRAM

CROSS REFERENCE TO RELATED APPLICATIONS

This application is based upon and claims the benefit of priority from Japanese patent application No. 2022-142441, filed on Sep. 7, 2022, the disclosure of which is incorporated herein in its entirety by reference.

BACKGROUND

The present disclosure relates to a charge support system, a charge support method, and a control program.

In recent years, a vehicle including a solar cell panel mounted thereon has been developed. The related art is disclosed, for example, in International Patent Publication No. 2016/072165.

International Patent Publication No. 2016/072165 discloses a vehicle traveling control apparatus that maximizes solar power generation by moving a vehicle to a sunny location during a period when the vehicle is not in operation.

SUMMARY

International Patent Publication No. 2016/072165 does not disclose the efficient electricity generation of all of a plurality of solar cell panels respectively mounted on a plurality of vehicle with different amounts of sunlight. Therefore, there is a problem in International Patent Publication No. 2016/072165 that it is not possible to efficiently charge all of a plurality of storage batteries respectively provided in a plurality of vehicle.

The present disclosure has been made in view of the aforementioned circumstances and an object thereof is to provide a charge support system, a charging support method, and a control program capable of efficiently charging a plurality of storage batteries respectively mounted on a plurality of vehicles.

A charge support system according to the present disclosure is a charge support system for a plurality of vehicles capable of traveling autonomously, each of the vehicles including a solar cell panel attached to a vehicle body and a storage battery configured to store electricity generated by the solar cell panel, the charge support system including: an acquisition unit configured to acquire, regarding the plurality of vehicles parked in a predetermined parking area, at least information about charging efficiencies of a plurality of the storage batteries of the respective vehicles by the electricity generated by a plurality of the solar cell panels of the respective vehicles and information about charging rates of the plurality of the storage batteries of the respective vehicles; and a traveling control unit configured to move the plurality of vehicles within a range of the predetermined parking area based on the information acquired by the acquisition unit. This charge support system can efficiently charge a plurality of storage batteries respectively mounted on a plurality of vehicles parked within a predetermined parking area by moving the plurality of vehicles within a range of the predetermined parking area based on charging efficiencies, charging rates, and the like of the plurality of storage batteries respectively mounted on the plurality of vehicles.

A charge support method according to the present disclosure is a charge support method for a plurality of vehicles capable of traveling autonomously, each of the vehicles including a solar cell panel attached to a vehicle body and a storage battery configured to store electricity generated by the solar cell panel, the charge support method including: acquiring, regarding the plurality of vehicles parked in a predetermined parking area, at least information about charging efficiencies of a plurality of the storage batteries of the respective vehicles by the electricity generated by a plurality of the solar cell panels of the respective vehicles and information about charging rates of the plurality of the storage batteries of the respective vehicles; and moving the plurality of vehicles within a range of the predetermined parking area based on the acquired information. This charge support method can efficiently charge a plurality of storage batteries respectively mounted on a plurality of vehicles parked within a predetermined parking area by moving the plurality of vehicles within a range of the predetermined parking area based on charging efficiencies, charging rates, and the like of the plurality of storage batteries respectively mounted on the plurality of vehicles.

A control program according to the present disclosure is a control program that causes a computer to execute charge support processing for a plurality of vehicles capable of traveling autonomously, each of the vehicles including a solar cell panel attached to a vehicle body and a storage battery configured to store electricity generated by the solar cell panel, the charge support processing including: acquiring, regarding the plurality of vehicles parked in a predetermined parking area, at least information about charging efficiencies of a plurality of the storage batteries of the respective vehicles by the electricity generated by a plurality of the solar cell panels of the respective vehicles and information about charging rates of the plurality of the storage batteries of the respective vehicles; and moving the plurality of vehicles within a range of the predetermined parking area based on the acquired information. This control program can efficiently charge a plurality of storage batteries respectively mounted on a plurality of vehicles parked within a predetermined parking area by moving the plurality of vehicles within a range of the predetermined parking area based on charging efficiencies, charging rates, and the like of the plurality of storage batteries respectively mounted on the plurality of vehicles.

According to the present disclosure, it is possible to provide a charge support system, a charging support method, and a control program capable of efficiently charging a plurality of storage batteries respectively mounted on a plurality of vehicles.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
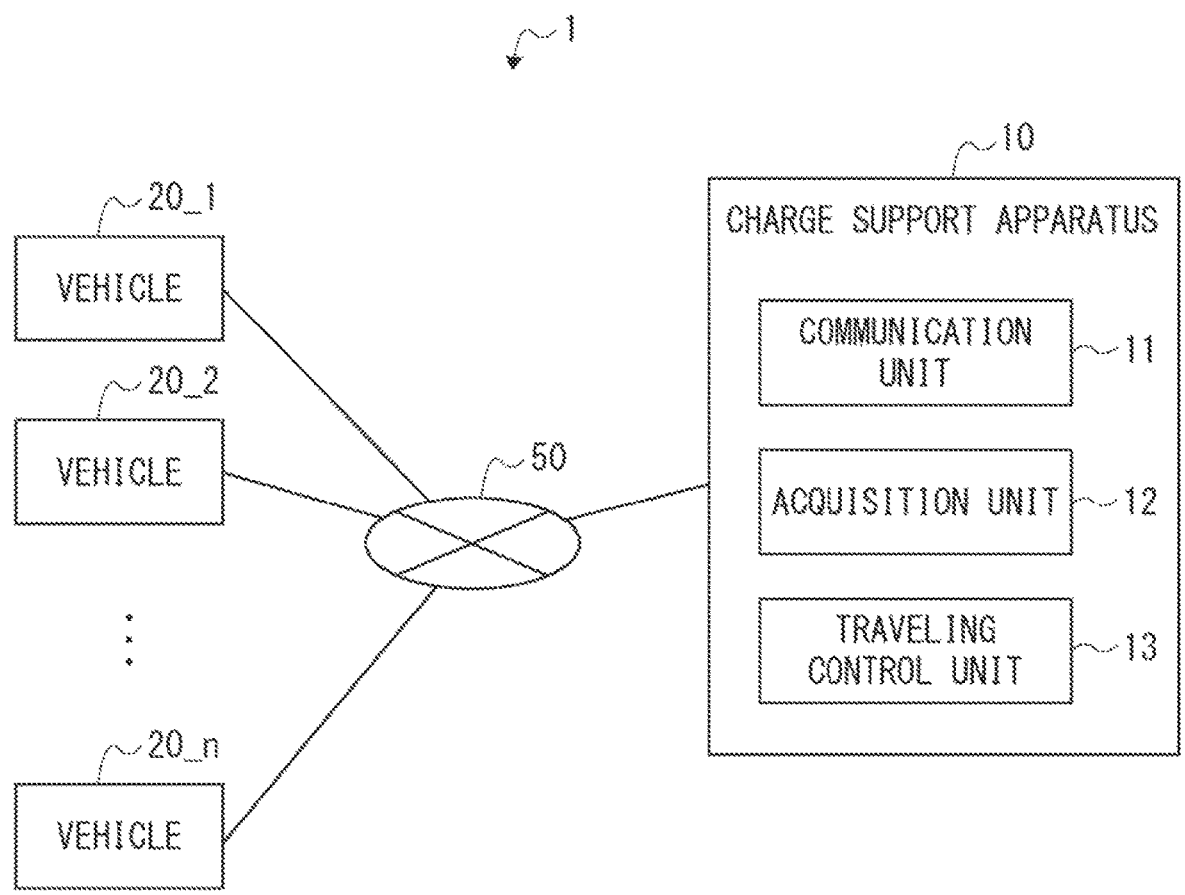
FIG. 1 is a diagram showing a configuration example of a charge support system according to a first embodiment.

The present disclosure will be described hereinafter with reference to an embodiment of the present disclosure. However, the following embodiment is not intended to limit the scope of the disclosure according to the claims. Further, all the components/structures described in the embodiment are not necessarily indispensable as means for solving the problem. For the clarification of the description, the following descriptions and the drawings are partially omitted and simplified as appropriate. The same elements are denoted by the same reference numerals or symbols throughout the drawings, and redundant descriptions are omitted as necessary.

First Embodiment

FIG. 1 is a diagram showing a configuration example of a charge support system 1 according to a first embodiment. The charge support system 1 according to the present embodiment can efficiently charge a plurality of storage batteries respectively mounted on a plurality of vehicles parked within a predetermined parking area by moving the plurality of vehicles within a range of the predetermined parking area based on charging efficiencies, charging rates, and the like of the plurality of storage batteries respectively mounted on the plurality of vehicles. The details of the above configuration will be described below.

As shown in FIG. 1, the charge support system 1 includes a charge support apparatus 10, n (n is an integer greater than or equal to two) vehicles 20_1 to 20_n capable of traveling autonomously, and a network 50. The charge support apparatus 10 can also be referred to as a charge support system by itself. The charge support apparatus 10 and the vehicles 20_1 to 20_n are configured to communicate with each other via a wired or wireless network 50.

All of the vehicles 20_1 to 20_n are parked within a predetermined parking area. For example, the vehicles 20_1 to 20_n are test vehicles parked within a parking area of a car dealer. Alternatively, the vehicles 20_1 to 20_n are rental cars parked within a parking area of a car rental store.

Figure 2:
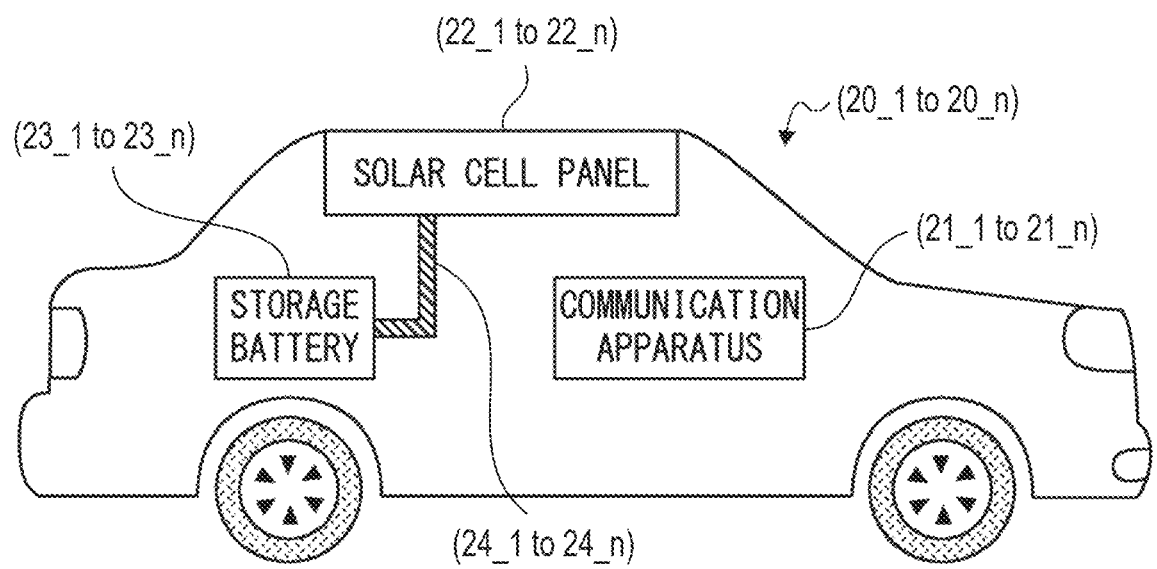
FIG. 2 is a diagram showing a configuration example of a vehicle used for the charge support system according to first embodiment.

FIG. 2 is a diagram showing a configuration example of the vehicle 20_1. As shown in FIG. 2, the vehicle 20_1 includes a communication apparatus 21_1, a solar cell panel 22_1, a storage battery 23_1, and a charging cable 24_1. Each configuration example of the vehicles 20_2 to 20_n is the same as that of the vehicle 20_1, and thus the descriptions thereof are omitted. However, the vehicle 20_2 includes a communication apparatus 21_2, a solar cell panel 22_2, a storage battery 23_2, and a charging cable 24_2. Similarly, the vehicle 20_n includes a communication apparatus 21_n, a solar cell panel 22_n, a storage battery 23_n, and a charging cable 24_n.

The communication apparatus 21_1 communicates with the charge support apparatus 10 (more specifically, a communication unit 11 of the charge support apparatus 10 described below) through the network 50.

The solar cell panel 22_1 is a panel that generates electricity by sunlight and is attached to a part of a vehicle body of the vehicle 20_1. For example, the solar cell panel 22_1 is attached to a roof, a hood, a door, or the like of the vehicle 20_1. In the present embodiment, a case in which the solar cell panel 22_1 is attached to the roof of the vehicle 20_1 will be described as an example.

The storage battery 23_1 is connected to the solar cell panel 22_1 via the charging cable 24_1 to store electricity generated by the solar cell panel 22_1. The storage battery 23_1 can be used as a backup power source or as a power source if the vehicle 20_1 is an electric vehicle.

In FIG. 1, the charge support apparatus 10 is an apparatus that supports the charging of each of the storage batteries 23_1 to 23_n of the vehicles 20_1 to 20_n. Specifically, the charge support apparatus 10 includes the communication unit 11, an acquisition unit 12, and a traveling control unit 13.

The communication unit 11 communicates with each of the communication apparatuses 21_1 to 21_n of the vehicles 201 to 20_n through the network 50. For example, the communication unit 11 receives information about charging efficiencies and charging rates of the storage batteries 231 to 23_n transmitted from the communication apparatuses 21_1 to 21_n of the respective vehicles 20_1 to 20_n, and transmits a traveling instruction to each of the vehicles 20_1 to 20_n.

The acquisition unit 12 periodically acquires, through the communication unit 11, at least information about charging efficiencies of the storage batteries 23_1 to 23_n by electricity generated by the solar cell panels 22_1 to 22_n and information about charging rates of the storage batteries 23_1 to 23_n. Here, the information about charging efficiency of the storage battery by electricity generated by the solar cell panel is, for example, output voltage of the solar cell panel, which corresponds to the amount of charge of storage battery per unit time.

Further, the acquisition unit 12 may be configured to further acquire information about the scheduled driving time of a driver of each of the vehicles 20_1 to 20_n via the communication unit 11.

The traveling control unit 13 moves the vehicles 20_1 to 20_n within a range of the predetermined parking area based on the information acquired by the acquisition unit 12.

For example, in a case in which the charging rate of the storage battery 23_1 of the vehicle 20_1 is greater than or equal to a predetermined rate and the charging rate of the storage battery 23_2 of the vehicle 20_2 is less than a predetermined rate, when the charging efficiency of the storage battery 23_1 is higher than the charging efficiency of the storage battery 23_2, the traveling control unit 13 controls the vehicle 20_1 and the vehicle 20_2 so that they automatically drive so as to exchange the parking position of the vehicle 20_1 with the parking position of the vehicle 20_2. That is, the traveling control unit 13 moves the vehicle 20_2 whose charging rate of the storage battery is low to an area where a charging efficiency is high. It should be noted that, in general, a charging efficiency of a storage battery mounted in a vehicle parked in a sunny area is high, while a charging efficiency of a storage battery mounted in a vehicle parked in a shady area is low.

Alternatively, in a case in which the charging rate of the storage battery 23_1 of the vehicle 20_1 and the charging rate of the storage battery 232 of the vehicle 20_2 are both less than a predetermined rate, when the scheduled driving time of a driver of the vehicle 20_1 is earlier than the scheduled driving time of the vehicle 20_2, the traveling control unit 13 moves the vehicle 20_1 preferentially over the vehicle 20_2 to an area where a charging efficiency is high. However, if the charging rate of the storage battery 231 reaches or exceeds a predetermined rate by the scheduled driving time of the driver of the vehicle 20_1, the traveling control unit 13 may not move the vehicle 20_1.

For example, when the scheduled driving time of the driver of each of the vehicles 20_1 to 20_n is not specifically determined, the traveling control unit 13 may move the vehicles 20_1 to 20_n periodically so that the charging rates of the storage batteries 23_1 to 23_n of the respective vehicles 201 to 20_n are equal to each other within a predetermined error range.

As described above, the charge support system 1 according to the present embodiment can efficiently charge the storage batteries 23_1 to 23_n respectively mounted on the vehicles 20_1 to 20_n parked within a predetermined parking area by moving the vehicles 20_1 to 20_n within a range of the predetermined parking area based on charging efficiencies, charging rates, and the like of the storage batteries 23_1 to 23_n respectively mounted on the vehicles 20_1 to 20_n.

(Operations of the Charge Support Apparatus 10)

Figure 3:
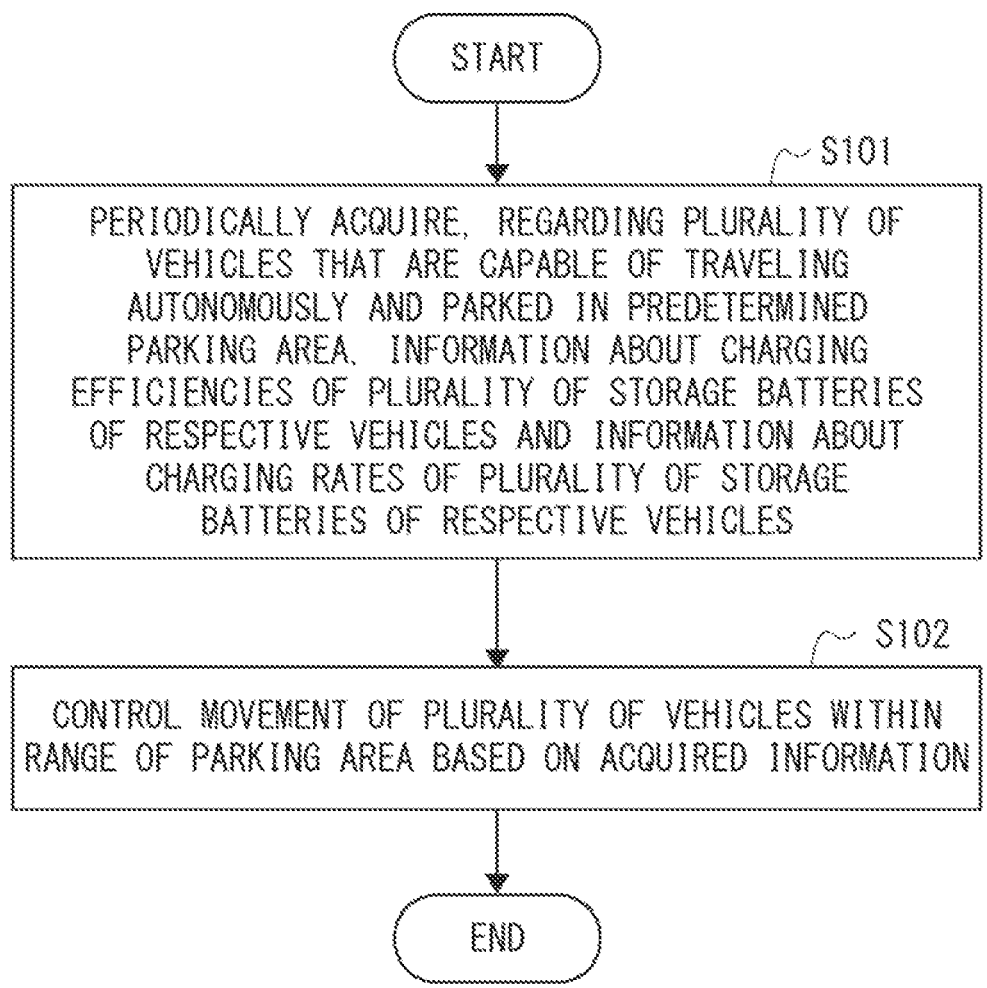
FIG. 3 is a flowchart showing the operation of a charge support apparatus according to the first embodiment.

Next, the operations of the charge support apparatus 10 will be described with reference to FIG. 3 and FIGS. 4A to 4D. FIG. 3 is a flowchart showing the operations of the charge support apparatus 10. FIGS. 4A to 4D are diagrams for explaining the operations of the charge support apparatus 10. A case in which the charge support apparatus 10 supports the charging of four vehicles 20_1 to 20_4 is explained below.

First, the charge support apparatus 10 periodically acquires information about charging efficiencies of the storage batteries 231 to 23_4 of the respective vehicles 20_1 to 20_4 by electricity generated by the solar cell panels 22_1 to 22_4 and information about charging rates of the storage batteries 23_1 to 23_n of the respective vehicles 201 to 20_4 (Step S101). In addition, the charge support apparatus 10 may further acquire information about a scheduled traveling time of a driver of each of the vehicles 20_1 to 20_4.

Figure 4A:
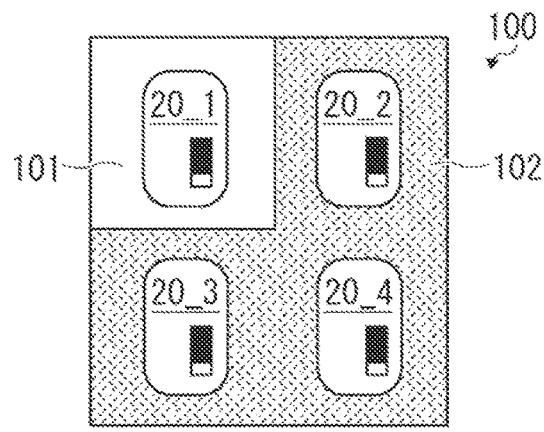
FIG. 4A is a diagram for explaining operations of the charge support apparatus according to the first embodiment.

In an example shown in FIG. 4A, in the initial state, the vehicle 20_1 is parked in a sunny area 101 of a parking area 100 and the vehicles 20_2 to 20_4 are parked in a shady area 102 of the parking area 100. Therefore, the charging efficiency of the storage battery 23_1 of the vehicle 20_1 is high and the charging efficiency of each of the storage batteries 23_2 to 23_4 of the vehicles 20_2 to 20_4 is low. Further, in the example shown in FIG. 4A, it is shown that, in the initial state, the charging rate of each of the storage batteries 23_1 to 23_4 of the vehicles 20_1 to 20_4 is less than a predetermined rate.

At this time, the charge support apparatus 10 acquires information indicating that the charging efficiency of the storage battery 23_1 is high and the charging efficiencies of the storage batteries 23_2 to 23_4 are low, and also acquires information indicating that all the charging rates of the storage batteries 23_1 to 23_4 are less than a predetermined rate. It should be noted that, as a matter of course, the charge support apparatus 10 may acquire specific numerical values of the charging efficiency and the charging rate of each of the storage batteries.

Figure 4B:
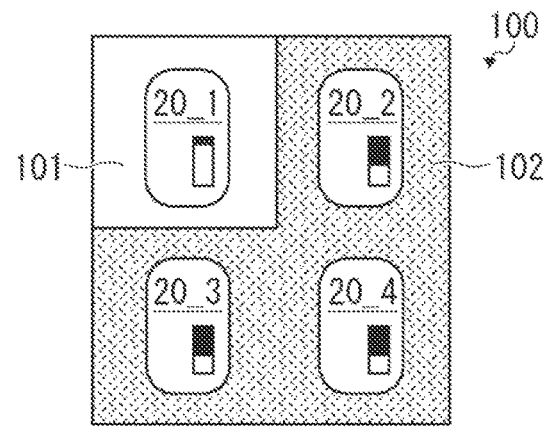
FIG. 4B is a diagram for explaining operations of the charge support apparatus according to the first embodiment.

Then, in an example shown in FIG. 4B, with the passage of time, the charging rate of the storage battery 23_1 whose charging efficiency is high reaches a predetermined rate.

When the charge support apparatus 10 acquires information that charging rate of the storage battery 23_1 has reached a predetermined rate, the charge support apparatus 10 moves the vehicles 201 to 20_4 within a range of the parking area 100 based on the acquired information (Step S102).

Figure 4C:
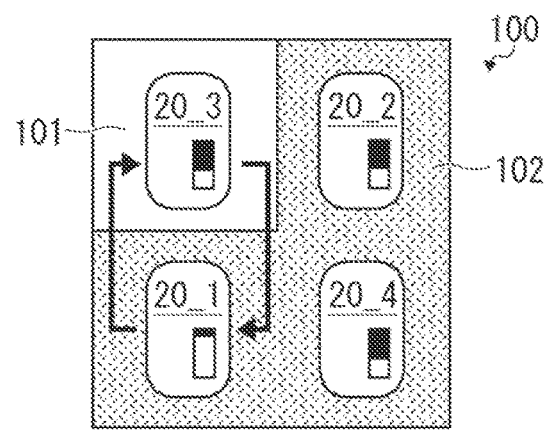
FIG. 4C is a diagram for explaining operations of the charge support apparatus according to the first embodiment.
Figure 4D:
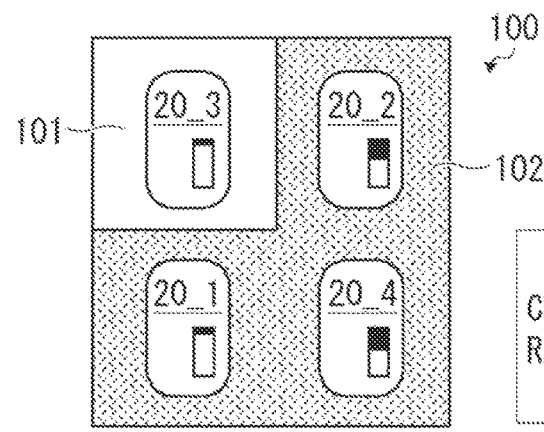
FIG. 4D is a diagram for explaining operations of the charge support apparatus according to the first embodiment.

In the example shown in FIG. 4B, the charging rate of the storage battery 23_1 of the vehicle 20_1 is greater than or equal to a predetermined rate and the charging rate of each of the storage batteries 23_2 to 23_4 of the vehicles 20_2 to 20_4 is less than a predetermined rate, and the charging efficiency of the storage battery 23_1 is higher than the charging efficiency of each of the storage batteries 23_2 to 23_4. In this case, the traveling control unit 13 exchanges the parking position of the vehicle 20_1 with one of the parking positions of the vehicles 20_2 to 20_4. Here, in this example, it is assumed that the scheduled traveling time of the driver of the vehicle 20_3 is earlier than the scheduled traveling time of the driver of each of the vehicles 20_2 and 20_4. Therefore, as shown in FIG. 4C, the traveling control unit 13 controls the vehicle 20_1 and the vehicle 20_3 so that they automatically drive so as to exchange the parking position of the vehicle 20_1 with the parking position of the vehicle 20_3. That is, the traveling control unit 13 preferentially moves the vehicle 20_3 to an area where a charging efficiency is high. As a result, as shown in FIG. 4D, the storage battery 23_3 of the vehicle 20_3 is charged with high efficiency. By repeating such processing, each of the storage batteries 23_1 to 23_4 of the vehicle 20_1~20_4 is charged with high efficiency.

As described above, the charge support system 1 according to the present embodiment can efficiently charge the storage batteries 23_1 to 23_n respectively mounted on the vehicles 20_1 to 20_n parked within a predetermined parking area by moving the vehicles 20_1 to 20_n within a range of the predetermined parking area based on charging efficiencies, charging rates, and the like of the storage batteries 23_1 to 23_n respectively mounted on the vehicles 20_1 to 20_n.

The present disclosure is not limited to the above-described embodiment and may be changed as appropriate without departing from the scope and spirit of the present disclosure. Further, the present disclosure relates to use of a solar photovoltaic panel, and contributes to carbon neutrality, decarbonization, and Sustainable Development Goals (SDGs).

Further, in the present disclosure, it is possible to implement all or part of processing performed by the charge support apparatus 10 by causing a Central Processing Unit (CPU) to execute a computer program.

The above-described program includes instructions (or software codes) that, when loaded into a computer, cause the computer to perform one or more of the functions described in the embodiment. The program may be stored in a non-transitory computer readable medium or a tangible storage medium. By way of example, and not a limitation, non-transitory computer readable media or tangible storage media can include a Random-Access Memory (RAM), a Read-Only Memory (ROM), a flash memory, a Solid-State Drive (SSD) or other types of memory technologies, a CD-ROM, a Digital Versatile Disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A charge support system for a plurality of vehicles capable of traveling autonomously, each of the vehicles comprising a solar cell panel attached to a vehicle body and a storage battery configured to store electricity generated by the solar cell panel, the charge support system comprising:
   a processor and memory storing instructions that, when executed, cause the system to function as:
      an acquisition unit configured to acquire, regarding the plurality of vehicles parked in a predetermined parking area, at least an information from each of respective vehicles regarding: (i) information indicating a charging efficiency of the storage battery of the respective vehicle based on electricity generated by the solar cell panel of the respective vehicle, (ii) information about a charging rate of the storage battery of the respective vehicle, and (iii) information about a scheduled driving time of a driver of the respective vehicle; and
      a traveling control unit configured to move the plurality of vehicles within a range of the predetermined parking area based on the information acquired by the acquisition unit, wherein the traveling control unit is programmed to: (i) move the plurality of vehicles so that the charging rate of the storage battery provided in the vehicle of which the scheduled driving time of an earliest driver becomes greater than or equal to a predetermined rate, and (ii) if the traveling control unit determines that a subset of the plurality of vehicles have no scheduled driving time identified, periodically moves the plurality of vehicles so that charging rates of the storage battery among the subset of the plurality of vehicles for which no scheduled driving time is identified are equal to each other within a predetermined error range.

2. A charge support method for a plurality of vehicles capable of traveling autonomously, each of the vehicles comprising a solar cell panel attached to a vehicle body and a storage battery configured to store electricity generated by the solar cell panel, the charge support method comprising:
   acquiring, regarding the plurality of vehicles parked in a predetermined parking area, at least an information from each of respective vehicles regarding: (i) information indicating a charging efficiency of the storage battery of the respective vehicle based on electricity generated by the solar cell panel of the respective vehicle, (ii) information about a charging rate of the storage battery of the respective vehicle; and (iii) information about a scheduled driving time of a driver of the respective vehicle; and
   moving the plurality of vehicles within a range of the predetermined parking area based on the acquired information, wherein
   in the moving of the plurality of vehicles, the plurality of vehicles are moved so that: (i) the charging rate of the storage battery provided in the vehicle of which the scheduled driving time of an earliest driver becomes greater than or equal to a predetermined rate, and (ii) if it is determined that a subset of the of the plurality of vehicles have no scheduled driving time identified, periodically move the plurality of vehicles so that charging rates of the storage battery among the subset of the plurality of vehicles for which no scheduled driving time is identified are equal to each other within a predetermined error range.

3. A non-transitory computer readable medium storing a control program for causing a computer to execute charge support processing for a plurality of vehicles capable of traveling autonomously, each of the vehicles comprising a solar cell panel attached to a vehicle body and a storage battery configured to store electricity generated by the solar cell panel, the charge support processing comprising:
   acquiring, regarding the plurality of vehicles parked in a predetermined parking area, at least an information from each of respective vehicles regarding: (i) information indicating a charging efficiency of the storage battery of the respective vehicle based on electricity generated by the solar cell panel of the respective vehicle, (ii) information about a charging rate of the storage battery of the respective vehicle; and (iii) information about a scheduled driving time of a driver of the respective vehicle; and
   moving the plurality of vehicles within a range of the predetermined parking area based on the acquired information, wherein
   in the processing for moving the plurality of vehicles, the plurality of vehicles are moved so that: (i) the charging rate of the storage battery provided in the vehicle of which the scheduled driving time of an earliest driver becomes greater than or equal to a predetermined rate, and (ii) if it determined that a subset of the of the plurality of vehicles have no scheduled driving time identified, periodically move the plurality of vehicles so that charging rates of the storage battery among the subset of the plurality of vehicles for which no scheduled driving time is identified are equal to each other within a predetermined error range.

* * * * *